(12) United States Patent
Pou

(10) Patent No.: US 10,047,271 B2
(45) Date of Patent: Aug. 14, 2018

(54) BIFUNCTIONAL ANTI-DEPOSIT AND ANTI-CORROSION ADDITIVES

(75) Inventor: Tong Eak Pou, Irigny (FR)

(73) Assignee: Arkema France, Colombes (FR)

( * ) Notice: Subject to any disclaimer, the term of this patent is extended or adjusted under 35 U.S.C. 154(b) by 634 days.

(21) Appl. No.: 14/342,598

(22) PCT Filed: Sep. 4, 2012

(86) PCT No.: PCT/FR2012/051978
§ 371 (c)(1),
(2), (4) Date: Mar. 4, 2014

(87) PCT Pub. No.: WO2013/034846
PCT Pub. Date: Mar. 14, 2013

(65) Prior Publication Data
US 2014/0216748 A1  Aug. 7, 2014

(30) Foreign Application Priority Data
Sep. 5, 2011  (FR) ..................... 11 57842

(51) Int. Cl.
*C09K 8/52* (2006.01)
*C09K 8/528* (2006.01)
*C09K 8/54* (2006.01)
*E21B 43/16* (2006.01)

(52) U.S. Cl.
CPC ............ *C09K 8/52* (2013.01); *C09K 8/528* (2013.01); *C09K 8/54* (2013.01); *E21B 43/16* (2013.01); *C09K 2208/32* (2013.01)

(58) Field of Classification Search
CPC ........ C09K 8/38; C09K 2208/32; C09K 8/52; C09K 8/68; C09K 8/703; C09K 2208/12; C09K 8/22; C09K 8/94; C09K 8/035; C09K 8/685; C09K 8/528; C09K 8/54; C09K 8/12; C09K 8/40; C09K 8/48; C09K 8/532; C09K 8/62; C09K 8/64; C09K 8/74; C09K 2208/22; C09K 2208/28; C09K 8/032; C09K 8/42; C09K 8/467; C09K 8/58; C09K 8/584; C09K 8/805; C09K 8/86; C09K 8/00; C09K 8/03; C09K 8/34; C09K 8/493; C09K 8/887; C09K 8/90; C09K 2208/08; C09K 8/06; C09K 8/506; C09K 8/665; C09K 8/80; C09K 2208/00; C09K 2208/04; C09K 2208/18; C09K 2208/20; C09K 2208/26; C09K 2208/30; C09K 8/08; C09K 8/20

See application file for complete search history.

(56) References Cited

U.S. PATENT DOCUMENTS

| | | | |
|---|---|---|---|
| 4,713,184 A * | 12/1987 | Zaid | C02F 5/14 507/236 |
| 2008/0227668 A1 * | 9/2008 | Welton | C09K 8/74 507/239 |
| 2009/0118380 A1 * | 5/2009 | Del Gaudio | A61K 9/1075 514/772 |
| 2010/0305010 A1 * | 12/2010 | Falana | C09K 8/06 507/274 |

FOREIGN PATENT DOCUMENTS

| WO | WO2006/078723 | * | 7/2006 |
| WO | WO 2006/078723 | | 7/2006 |

OTHER PUBLICATIONS http://www.statensnet.dk/pligtarkiv/fremvis.pl7vaerkid =6944 &reprid=0&filid=34&iarkiv . . . downloaded on Oct. 20, 2016.*
Laureth-23 MSDS sheet downloaded on Oct. 21, 2016.*
D. Ann Davis; "Development of combined multifunctional chemical inhibitors";, 2nd International Conférence on Controlling Hydrates, Waxes and Asphaltenes, Oct. 20-21, 1997, Aberdeen, IBC UK Conférences Ltd.
International Search Report for PCT/FR2012/051978, dated Dec. 14, 2012.

* cited by examiner

*Primary Examiner* — Kumar R Bhushan
(74) *Attorney, Agent, or Firm* — RatnerPrestia

(57) ABSTRACT

The invention concerns bifunctional compositions usable in the field of extraction of hydrocarbons, oil and/or gas, said compositions being homogeneous, clear and stable and comprising at least one anti-mineral-deposit additive, at least one corrosion inhibitor, and at least one agent for compatibilizing between the anti-mineral-deposit additive and the corrosion inhibitor.

11 Claims, 1 Drawing Sheet

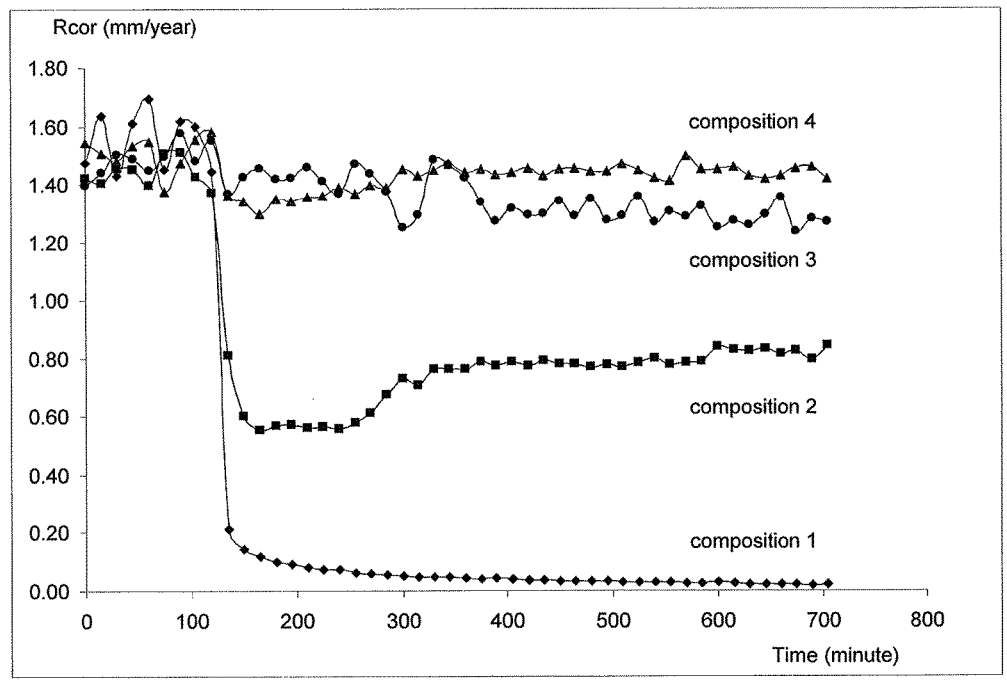
--Figure 1--
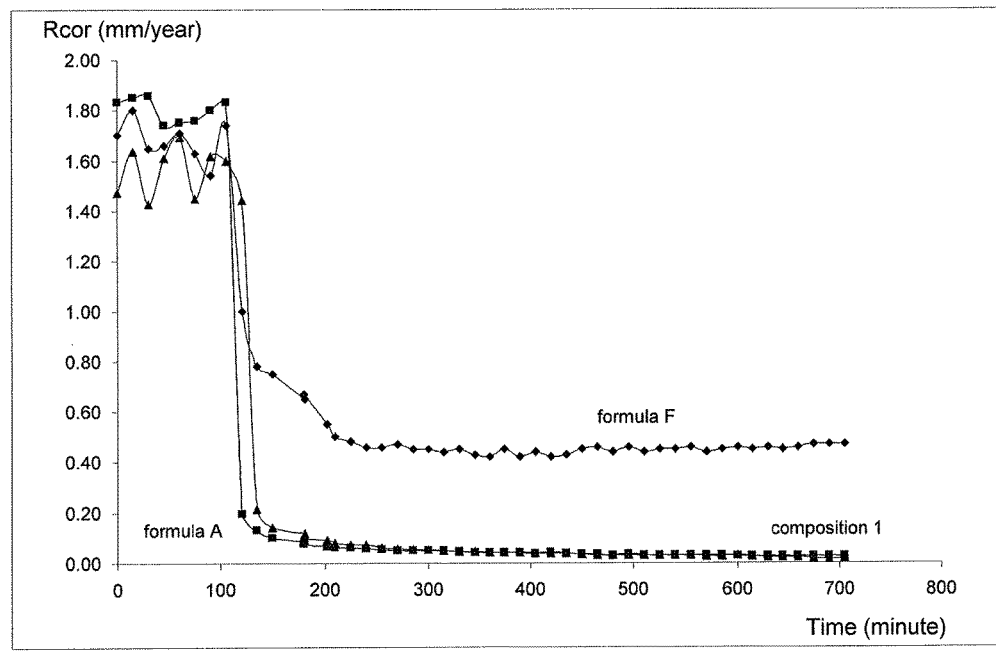
--Figure 2--

BIFUNCTIONAL ANTI-DEPOSIT AND ANTI-CORROSION ADDITIVES

CROSS REFERENCE TO RELATED APPLICATIONS

This application is the U.S. National Phase application of PCT International Application No. PCT/FR2012/051978, filed Sep. 4, 2012, and claims priority to French Patent Application No. 1157842, filed Sep. 5, 2011, the disclosures of which are incorporated by reference in their entirety for all purposes.

FIELD OF THE INVENTION

The present invention relates to the field of the extraction of hydrocarbons and more specifically to the additives which are added to said hydrocarbons and/or to fluids comprising said hydrocarbons in order to limit blockages and corrosion of the plants (ducts, valves and others) used for their extraction.

BACKGROUND OF THE INVENTION

During the extraction of hydrocarbons (or production of hydrocarbons), more particularly during the extraction of crude oil and the extraction of gas from subsurface strata, water, gas and hydrocarbons are always produced simultaneously and are raised toward the surface. The presence of water, in relatively large amounts, is thus inherent in the production of hydrocarbons and is the cause of many problems which will disrupt the production lines.

This is because the water present with the hydrocarbons extracted is often responsible for the corrosion of the pipes, ducts, tubes, valves and other metal components. This water can optionally be reinjected into the subsurface strata in order to help in the extraction of hydrocarbons. In addition, the water generally comprises dissolved or undissolved minerals which can precipitate and/or agglomerate, according to the temperature, pressure and pH conditions.

In order to solve these problems, it is well known to use several chemical additives which are injected into the mixtures of hydrocarbons, gas and water when they are extracted and/or into the subsurface strata where they are present, before their extraction.

These additives can be grouped together as corrosion inhibitors (or anticorrosion additives), bactericides, mineral scale inhibitors, hydrate inhibitors, demulsifiers, asphaltene inhibitors, paraffin inhibitors and others. These products are generally incompatible with one another and it is today necessary to inject them one by one, separately, which multiplies the operations and the storage, circulation and injection systems.

D. Ann Davis ("Development of combined multifunctional chemical inhibitors", $2^{nd}$ International Conference on "Controlling Hydrates, Waxes And Asphaltenes", October $20^{th}$-$21^{st}$, (1997), Aberdeen, IBC UK Conferences Ltd.) presented various possible asphaltene inhibitors/paraffin inhibitors/mineral scale inhibitors, hydrate inhibitors/corrosion inhibitors/paraffin inhibitors and also mineral scale inhibitors/paraffin inhibitors combinations.

The formulas combining mineral scale inhibitors, which are used to prevent the formation of deposits of mineral salts, such as, for example and without implied limitation, alkali metal and alkaline earth metal salts, such as calcium, barium or strontium salts and in particular calcium carbonate and/or calcium or barium sulfates, are not, however, mentioned in this publication. Likewise, this publication does not mention corrosion inhibitors.

In point of fact, it will be highly advantageous to be able to have available such a bifunctional additive simultaneously combining the properties of a corrosion inhibitor and the properties of a mineral scale inhibitor. Such a bifunctional additive would make it possible to reduce in particular the number of operations and also the number of injection lines and points, which would represent a considerable saving in the system for the extraction of the hydrocarbons.

It has now been discovered, and this represents a first subject matter of the invention, that it is possible to render a corrosion inhibitor and a mineral scale inhibitor compatible, that is to say to obtain a homogeneous, clear and in particular stable solution of at least one corrosion inhibitor and of at least one mineral scale inhibitor, which can be effectively used during the extraction of hydrocarbons, crude oil and/or gas, either for the extraction proper or in order to be added to the reinjected fluids which comprise a majority of water extracted from the production wells, referred to as production water in the continuation of the present account.

SUMMARY OF THE INVENTION

Thus, the present invention relates first of all to a ready-for-use composition comprising:
- at least one corrosion inhibitor,
- at least one mineral scale inhibitor, and
- at least one compatibility agent which is a water-soluble nonionic, cationic or amphoteric surfactant.

According to another aspect, the invention relates to the use of at least one sulfur-comprising additive as defined above in a bifunctional composition comprising at least one mineral scale inhibitor and at least one corrosion inhibitor, this bifunctional composition preferably being used in the field of the extraction of hydrocarbons.

according to yet another aspect, the present invention relates to a composition comprising:
   from 10% to 40%, preferably from 15% to 40%, more preferably from 20% to 40%, by weight, of at least one mineral scale inhibitor,
   from 15% to 60%, preferably from 20% to 55%, more preferably from 25% to 50%, by weight, of at least one corrosion inhibitor,
   from 1% to 20%, preferably from 4% to 20%, of at least one compatibility agent, and
   from 1% to 10%, preferably from 3% to 10%, by weight, of at least one sulfur-comprising additive, and
   optionally at least one solvent in a quantity sufficient for (q.s. for) reaching 100%.

BRIEF DESCRIPTION OF THE DRAWINGS

FIG. 1 is a graph of the rates of corrosion as a function of time showing the effect of a scale inhibitor on a corrosion inhibitor.

FIG. 2 is a graph of the rates of corrosion as a function of time for a reference composition, Formula A, and Formula F.

DETAILED DESCRIPTION

In the composition according to the invention, the term "corrosion inhibitor" is understood to mean all the corrosion inhibitors known to a person skilled in the art, in particular those commonly used in the field of the extraction of hydrocarbons.

More particularly, the corrosion inhibitor(s) which can be used in the compositions of the present invention are chosen from fatty amines, fatty amine derivatives (amino acids, aminoalcohols, amidoamines, quaternary ammoniums, pyridine derivatives), imidazolines substituted by at least one fatty chain, ester amines, ether amines, fatty alcohol derivatives and phosphoric esters substituted by at least one fatty chain.

The term "fatty chain" is understood to mean a hydrocarbon radical comprising at least 8 carbon atoms, preferably at least 10 carbon atoms, in particular a hydrocarbon radical comprising from 8 to 40 carbon atoms, preferably from 10 to 30 carbon atoms, more preferably still from 12 to 28 carbon atoms.

Mention may be made, as examples of corrosion inhibitors which can be advantageously used in the compositions of the present invention, without implied limitation, of the corrosion inhibitors sold by CECA S.A., and in particular those of the Norust® range, for example Amphoram® CP1, Noramium® DA50, and others.

In the composition according to the invention, the term "mineral scale inhibitors" is understood to mean all the mineral scale inhibitors known to a person skilled in the art and in particular those commonly used in the field of the extraction of hydrocarbons. These scale inhibitors are generally anionic compounds, which renders them incompatible with the corrosion inhibitors defined above, which are generally cationic, nonionic or amphoteric compounds.

As nonlimiting examples, the mineral scale inhibitor(s) which can be used in the compositions of the present invention are chosen from:

acidic or neutralized aminophosphonates, for example those sold by Solutia under the Dequest® name or by Lanxess under the Bayhibit® name;

poly(acrylic acid)s and poly(alkyl acrylate)s, such as those sold by Coatex under the generic name Coatex TH®;

copolymers based on phosphinocarboxylic acids, for example those sold by BWR under the Bellasol® name;

tannins;

lignosulfonates;

polyacrylamides;

naphthalenesulfonates;

and other mineral scale inhibitors known to a person skilled in the art.

As indicated above, in the field of the extraction of hydrocarbons, corrosion inhibitors are incompatible with scale inhibitors: the inhibitory effectivenesses of the corrosion inhibitors brought about by carbon dioxide ($CO_2$) and/or hydrogen sulfate ($H_2S$) are considerably, and even completely, damaged by the mineral scale inhibitors. The compatibility of these two inhibitors is one of the problems to be taken into consideration for the selection of the corrosion inhibitors.

It has now been discovered that it is possible to prepare formulations combining corrosion inhibitors and scale inhibitors while retaining the same degree of effectiveness or at the very least an acceptable degree of effectiveness, both of the corrosion inhibitor and of the mineral scale inhibitor. According to a very particularly preferred embodiment, these formulations (compositions according to the present invention) are aqueous formulations.

This combination is rendered possible by virtue of the addition of a compatibility agent which thus makes it possible to obtain a homogenous, clear and stable bifunctional formulation, without formation of precipitate, having both the properties of a corrosion inhibitor and of a mineral scale inhibitor, it being possible for this bifunctional formulation to be administered by means of just one line for injection into oil and/or gas extraction products, in particular in deep waters.

The compatibility agent present in the composition according to the present invention is a surfactant belonging to the family of the nonionic, cationic or amphoteric surfactants and is preferably a surfactant of the family of the ethoxylated fatty-chain amines, quaternized fatty-chain amines, fatty-chain amino acids, oxyethylated and/or oxypropylated and/or oxybutylated condensates, alkylarylsulfonates, oxyethylated and/or oxypropylated fatty-chain alcohols, and others, and also the mixtures of two or more of them in all proportions, where the expression "fatty-chain" is as defined above.

Mention may more specifically be made, as nonlimiting examples of surfactants which make possible the compatibility of corrosion inhibitors and mineral scale inhibitors, of in particularly alkoxylated amino acids, alkoxylated imidazolines, Noramox® C11, Noramium® DA50, Amphoram® CP1, the Pluronic® products and the Remcopal® products, sold by CECA S.A. The term "alkoxylated" describes compounds which have been subjected to one or more alkoxylation reactions, in particular ethoxylation (ethoxylated compounds), propoxylation (propoxylated compounds) or butoxylation (butoxylated products) reactions. Preference is given to ethoxylated and/or propoxylated compounds, more preferably ethoxylated compounds.

Among the abovementioned surfactants which can be used as compatibility agents for the compositions according to the present invention, some of them also exhibit intrinsic corrosion-inhibiting properties. This is the case, for example, for Noramium® DA50, Amphoram® CP1, ethoxylated amines, in particular ethoxylated imidazolines, and Noramox® C11.

As a general rule, in the field of the extraction of hydrocarbons, it is standard to separately treat the extracted fluids with at least one mineral scale inhibitor and with a corrosion inhibitor in a proportion by weight of approximately 1:2. In point of fact, in these proportions, the scale inhibitor and the corrosion inhibitor are incompatible. It has now been discovered, entirely surprisingly, that the addition of a compatibility agent, which can itself be a corrosion inhibitor, makes it possible to obtain a homogeneous, clear and stable composition, without the corrosion inhibitor significantly disrupting the scale-inhibiting activity and without the mineral scale inhibitor significantly disrupting the corrosion-inhibiting activity.

According to a preferred embodiment, the composition according to the present invention also comprises at least one solvent, generally chosen from water, water-soluble organic solvents and water/water-soluble organic solvent(s) mixtures, more preferably from water and water/water-soluble organic solvent(s) mixtures. Mention may be made, among water-soluble organic solvents, of alcohols and ethers in particular, among which preference is given to alkanols and glycols, such as, for example and without implied limitation, those chosen from methanol, ethanol, glycol, monoethylene glycol (MEG), diethylene glycol (DEG), triethylene glycol (TEG), 2-butoxyethanol and the mixtures of two or more of them in all proportions.

Also according to a preferred embodiment, the composition of the present invention comprises:

from 10% to 40%, preferably from 15% to 40%, more preferably from 20% to 40%, by weight, of at least one mineral scale inhibitor, from 15% to 60%, preferably from 20% to 55%, more preferably from 25% to 50%, by weight, of at least one corrosion inhibitor, from 1% to 20%, preferably from 4% to 20%, of at least one compatibility agent as defined above, and optionally at least one solvent as defined above in a quantity sufficient for (q.s. for) reaching 100%.

Unless otherwise indicated, in the description of the present invention, all the percentages are expressed in weight.

The composition according to the invention is a stable, homogeneous and clear bifunctional composition exhibiting both the properties of a corrosion inhibitor and of a scale inhibitor. The compatibility agent present in said bifunctional composition makes it possible to counter or at the very least very greatly reduce the antagonist effect of the mineral scale inhibitor toward the corrosion inhibitor.

Thus, by virtue of the composition according to the present invention, a person skilled in the art can have available a corrosion inhibitor exhibiting mineral scale-inhibiting properties or alternatively a person skilled in the art can have available a mineral scale inhibitor having corrosion-inhibiting properties.

According to another aspect, the present invention also relates to a bifunctional composition as described above additionally comprising an additive which makes it possible to further improve the effectiveness of the corrosion-inhibiting composition. This is because, in some cases, it has been observed that the corrosion-inhibiting properties can be detrimentally affected due to the presence of the mineral scale inhibitor, this being the case despite the presence of the compatibility agent.

This problem has been effectively solved by virtue of the presence, in the bifunctional composition according to the invention, of at least one sulfur-comprising additive chosen from mercapto acids, mercapto alcohols, and others, and also mixtures of two or more of them in all proportions.

According to another aspect, the invention relates to the use of at least one sulfur-comprising additive as defined above in a bifunctional composition comprising at least one mineral scale inhibitor and at least one corrosion inhibitor, this bifunctional composition preferably being used in the field of the extraction of hydrocarbons.

Nonlimiting examples of such sulfur-comprising additives which can advantageously be present in the bifunctional composition of the invention are mercaptoethanol, mercaptopropanol, thioglycolic acid and mercaptopropionic acid, to mention only the most readily available among them.

Thus, and according to yet another aspect, the present invention relates to a composition comprising:

from 10% to 40%, preferably from 15% to 40%, more preferably from 20% to 40%, by weight, of at least one mineral scale inhibitor, from 15% to 60%, preferably from 20% to 55%, more preferably from 25% to 50%, by weight, of at least one corrosion inhibitor, from 1% to 20%, preferably from 4% to 20%, of at least one compatibility agent as defined above, and from 1% to 10%, preferably from 3% to 10%, by weight, of at least one sulfur-comprising additive as defined above, and optionally at least one solvent as defined above in a quantity sufficient for (q.s. for) reaching 100%.

The bifunctional compositions according to the present invention can additionally comprise one or more other additives, fillers, and others, which are inert with respect to the effectivenesses of the corrosion inhibitors and mineral scale inhibitors present in said bifunctional composition.

Such additives are well known to a person skilled in the art and mention may be made, among them, without implied limitation, of stabilizing agents, preservatives, UV inhibitors, flame retardants, solvents, colorants and others.

The bifunctional compositions according to the invention can be prepared by any known means and generally by simple mixing of the various components of said compositions in any order. However, it is preferable to mix, with stirring, the corrosion inhibitor(s) and the compatibility agent(s), optionally in the solvent(s), then the mineral scale inhibitor(s) and, finally, optionally the sulfur-comprising additive(s) and the other additives defined above.

The bifunctional compositions according to the present invention thus have an entirely advantageous use in the field of the extraction of hydrocarbons, oil and/or gas. These compositions can be injected according to all methods well known to a person skilled in the art, continuously, batchwise or by the squeeze method, preferably continuously, into the lines for the extraction of said hydrocarbons, into the lines for the injection of production waters and generally into any aqueous, organic or aqueous/organic fluid employed in the fields of extraction of hydrocarbons. It is also possible, for example, to inject these compositions via the gas-lift system well known to a person skilled in the art.

The amount of bifunctional formulation according to the invention injected can vary within wide proportions, according to the requirements and the nature and the composition of the products extracted. As a general rule, the amount injected is between 1 ppm and 1000 ppm, preferably between 50 ppm and 800 ppm, where "ppm" represents parts by weight of bifunctional composition per one million parts by volume of aqueous, organic or aqueous/organic fluid to be treated.

The present invention is now illustrated by means of the examples which follow and which do not under any circumstances limit the scope of the protection as applied for in the appended claims.

EXAMPLES

Measurement Methods
Mineral Scale-Inhibiting Effectiveness (Calcium Carbonate):

The calcium carbonate scale-inhibiting effectiveness is determined according to the method of the National Association of Corrosion Engineers (NACE), Standard TM-03-074. This method is based on the quantitative determination of calcium in water in the absence and in the presence of scale inhibitor.

The tests are carried out at 25 ppm (weight/volume) of scale inhibitor in an aqueous calcium carbonate solution.

The scale-inhibiting effectiveness is expressed as a percentage of effectiveness, according to the following relationship:

$$\% \; Eff(SI) = \frac{([Ca_3] - [Ca_2])}{([Ca_1] - [Ca_2])} \times 100$$

where: % Eff (SI) represents the percentage of effectiveness of the scale inhibitor, [Ca$_1$] represents the concentration of dissolved calcium ions, before deposition and without inhibitor, [Ca$_2$] represents the concentration of dissolved calcium ions, after deposition and without inhibitor, and [Ca$_3$] represents the concentration of dissolved calcium ions, after deposition and with inhibitor.

Corrosion-Inhibiting Effectiveness:

The corrosion-inhibiting effectiveness is expressed in the form of rate of corrosion of a carbon steel as a function of time. The rate of corrosion of a steel is determined by the LPR (Linear Polarization Resistance) method. In the presence of corrosion inhibitor, the lower the rate of corrosion, the more effective the inhibitor.

The measurements of rate of corrosion by the LPR method are carried out under the following conditions: The corrosive medium is a 30 g/l aqueous sodium chloride (NaCl) solution. This solution is deaerated beforehand by sparging with nitrogen for at least one hour. Finally, it is saturated with carbon dioxide (CO$_2$). The sparging with CO$_2$ is maintained throughout the duration of the test. The working temperature is 80° C. The tests are carried out at 50 ppm (weight/volume) of corrosion inhibitor.

The effectiveness of the corrosion inhibitor is expressed as percentage of effectiveness, according to the following relationship:

$$\% \; Eff(CI) = \frac{([Rcor_1] - [Rcor_2])}{(Rcor_1)} \times 100$$

where: % Eff (CI) represents the percentage of effectiveness of the corrosion inhibitor, Rcor$_1$ represents the rate of corrosion in the absence of corrosion inhibitor and Rcor$_2$ represents the rate of corrosion in the presence of corrosion inhibitor.

However, it is standard practice in the field of corrosion inhibition to consider only the residual rate of corrosion (that is to say, after treatment or after injection of the corrosion inhibitor). The lower this residual rate of corrosion, the more effective the corrosion inhibitor. An effective corrosion inhibitor, at a given dose, generally exhibits a residual rate of corrosion of the steel of less than 0.1 mm/year.

Example 1

It is known that a mineral scale inhibitor added to a corrosive medium comprising a corrosion inhibitor brings about a loss of the corrosion-inhibiting activity of the latter.

In order to demonstrate this phenomenon, a corrosion-inhibiting test is carried out according to the LPR method described above, in which test a curve of rate of corrosion as a function of time is plotted for each of the following compositions:

Composition 1: CECA Norust® 740 at 50 ppm (weight/volume) in water;

Composition 2: CECA Norust® 740 at 50 ppm (weight/volume) with 10 ppm (weight/volume) of Bellasol® S50 from BWR in water;

Composition 3: CECA Norust® 740 at 50 ppm (weight/volume) with 25 ppm (weight/volume) of Bellasol® S50 from BWR in water;

Composition 4: CECA Norust® 740 at 50 ppm (weight/volume) with 50 ppm (weight/volume) of Bellasol® S50 from BWR in water.

The curves of rates of corrosion (Rcor, expressed in mm/year) observed as a function of time, expressed in minutes, for each of compositions 1 to 4 described above are presented in FIG. 1. As shown in FIG. 1, the presence of the scale inhibitor (Bellasol® S50) results in a loss in effectiveness of the corrosion inhibitor (Norust® 740). The greater the amount of scale inhibitor, the more the corrosion-inhibiting activity decreases.

The antagonist effect of the corrosion inhibitor on the effectiveness of the mineral scale inhibitor is similar. Example 2 illustrates this effect.

Example 2

The effectiveness of two calcium carbonate scale inhibitors, Bayhibit® AM50 from Lanxess (25 ppm weight/vol) and Bellasol® S50 from BWR (25 ppm weight/vol), is measured according to the method of the NACE described above, in the absence and in the presence of corrosion inhibitor, Norust® 740 from CECA (50 ppm weight/vol).

The mixture of Norust® 740 with Bayhibit® AM50, in these proportions, exists in the form of a slightly cloudy liquid which might be acceptable in the uses envisaged. However, the effectiveness of this mixture is altogether inadequate, as is shown by the results presented in table 1 below.

The mixture of Norust® 740 with Bellasol® S50, in these proportions, is not stable and a phase separation is observed, with precipitation of a viscous gel. This already shows the physical incompatibility of the two types of inhibitors. Furthermore, the antagonist influence of the corrosion inhibitor on the mineral scale inhibitor, as in the case of the mixture described in the preceding paragraph, is presented in table 1 below.

TABLE 1

|  | Bayhibit® AM50 | Bayhibit® AM50 + Norust® 740 | Bellasol® S50 | Bellasol® S50 + Norust® 740 |
| --- | --- | --- | --- | --- |
| % scale-inhibiting effectiveness | 93% | 21% | 91% | 10% |

The results of examples 1 and 2 indisputably show the incompatibility between a mineral scale inhibitor and a corrosion inhibitor.

Example 3

A formula F, according to the invention, based on Norust® 740, on Bellasol® S50 and, as compatibility agent, on Noramox® C11 from CECA is prepared. This formula F is clear, stable and homogeneous.

More specifically, the composition of formulation F is as follows:

Norust® 740: 9%

Bellasol® S50: 18%

Noramox® C11: 12%

Glycolic solvent: q.s. for 100%

The glycolic solvent used is a solvent based on monoethylene glycol.

This formula F is used in tests of corrosion inhibition and of mineral scale-inhibiting effectiveness, as described in examples 1 and 2. The results of the calcium carbonate scale-inhibiting effectiveness are 91% with Bellasol® S50 and 90% with formula F.

From the viewpoint of the mineral scale-inhibiting properties, it is found that formula F exhibits the same effectiveness as the reference inhibitor.

Example 4

A corrosion test according to the LPR method is carried out, as described in example 1, in order to compare the rates of corrosion of formula F with respect to the reference Norust® 740.

At the dose of 50 ppm, Norust® 740 exhibits a stabilized rate of corrosion of less than 0.1 mm/year. At this same dose, formula F exhibits a stabilized rate of corrosion of approximately 0.45 mm/year.

It is thus clearly established that the presence of a compatibility agent in a formulation comprising both a mineral scale inhibitor (SI) and a corrosion inhibitor (CI) makes it possible to counter the antagonist activity of the SI toward the CI, and vice-versa. Although this formulation is both corrosion-inhibiting and mineral scale-inhibiting, it is possible to further improve the performance of the corrosion-inhibiting activity.

Example 5

Another formulation of SI and CI is prepared by adding a sulfur-comprising additive in order to further improve the corrosion-inhibiting performance. This formulation is denoted formula A.

Formula A exhibits the following composition:

| | |
|---|---|
| Norust ® 740: | 9% |
| Bellasol ® S50: | 18% |
| Noramox ® C11: | 12% |
| Thioglycolic acid: | 4.5% |
| Glycolic solvent: | q.s. for 100% |

This formula A exhibits a mineral scale-inhibiting effectiveness altogether similar to that of the reference scale inhibitor (approximately 90%). The formula A is also used in a corrosion inhibition test according to the LPR method.

The curves of rate of corrosion (Rcor, expressed in mm/year) as a function of time (expressed in minutes) of composition 1 (reference), of formula F and of formula A are presented in FIG. 2. It clearly emerges from this figure that the formula A exhibits a stabilized rate of corrosion of less than 0.1 mm/year, of the order of 0.03 mm/year, that is to say altogether similar to that observed for composition 1, which is the reference corrosion inhibitor, Norust® 740.

The invention claimed is:

1. A composition comprising
   from 15% to 60% by weight of at least one corrosion inhibitor,
   from 10% to 40% by weight of at least one mineral scale inhibitor,
   at least one sulfur-comprising additive chosen from mercapto acids and mercapto alcohols, and
   from 1 to 20% by weight of at least one compatibility agent, and,
   optionally at least one solvent in a quantity sufficient for (q.s. for) reaching 100%,
   wherein the compatibility agent is a water-soluble nonionic, cationic or amphoteric surfactant,
   wherein the corrosion inhibitor is a fatty amine derivative chosen from amino acids, aminoalcohols, amidoamines, and pyridine derivatives, and
   wherein the composition does not comprise an acidic or neutral aminophosphonate.

2. The composition as claimed in claim 1, wherein the mineral scale inhibitor is chosen from poly(acrylic acids, poly(alkyl acrylate)s, copolymers based on phosphinocarboxylic acids, tannins, lignosulfonates, polyacrylamides, and naphthalenesulfonates.

3. The composition as claimed in claim 1, wherein the compatibility agent is chosen from ethoxylated fatty-chain amines, quaternized fatty-chain amines, fatty-chain amino acids, oxyethylated and/or oxypropylated condensates, alkylarylsulfonates, oxyethylated and/or oxypropylated fatty-chain alcohols, and mixtures of two or more of them in all proportions.

4. The composition as claimed in claim 1, additionally comprising at least one solvent chosen from water, water-soluble organic solvents and water/water-soluble organic solvent(s) mixtures.

5. The composition as claimed in claim 1, wherein the at least one sulfur-comprising additive is chosen from mercaptoethanol mercaptopropanol, thioglycolic acid and mercaptopropionic add.

6. The composition as claimed in claim 1, comprising:
   from 1% to 10% by weight of the at least one sulfur-comprising additive.

7. The composition as claimed # claim 1, comprising:
   from 15% to 40% by weight of the at least one mineral scale inhibitor,
   from 20% to 55% by weight of the at least one corrosion inhibitor,
   from 4% to 20% by weight of the at least one compatibility agent, and
   optionally at least one solvent in a quantity sufficient for (q.s. for) reaching 100%.

8. The composition as claimed in claim 1, comprising:
   from 15% to 40% by weight of the at e one mineral scale inhibitor,
   from 20% to 55% by weight of the at least one corrosion inhibitor,
   from 4% to 20% by weight of the at least one compatibility agent, and
   from 3% to 10% by weight of the at least one sulfur-comprising additive, and
   optionally at least one solvent in a quantity sufficient for (q.s. for) reaching 100%.

9. A method of extracting hydrocarbons, oil or gas, continuously, batchwise or by the squeeze method from lines, comprising injecting the composition as claimed in claim 1 in the lines for the extraction of the hydrocarbons.

10. The method as claimed in claim 8, wherein the amount of the composition injected is between 1 ppm and 1000 ppm (weight/volume).

11. The method as claimed in claim 9, wherein the amount of the composition injected is between 50 ppm and 800 ppm (weight/volume).

* * * * *